(12) United States Patent
Herwadkar

(10) Patent No.: US 8,886,549 B2
(45) Date of Patent: Nov. 11, 2014

(54) INCREMENTAL, REAL-TIME COMPUTATION OF AGGREGATE EXPRESSIONS

(75) Inventor: Rahul V. Herwadkar, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 2457 days.

(21) Appl. No.: 11/322,496

(22) Filed: Dec. 30, 2005

(65) Prior Publication Data

US 2007/0162500 A1    Jul. 12, 2007

(51) Int. Cl.
*G06Q 10/00* (2012.01)
*G06Q 90/00* (2006.01)
*G06Q 10/10* (2012.01)
*G06Q 10/06* (2012.01)

(52) U.S. Cl.
CPC ............... *G06Q 10/10* (2013.01); *G06Q 10/06* (2013.01)
USPC ........................... 705/7.11; 705/7.27; 705/500

(58) Field of Classification Search
USPC ....................................... 705/7.27, 7.11, 500
See application file for complete search history.

(56) References Cited

U.S. PATENT DOCUMENTS

| 5,537,590 | A | 7/1996 | Amado |
| 5,701,400 | A | 12/1997 | Amado |
| 2002/0059183 | A1* | 5/2002 | Chen ................................. 707/1 |
| 2002/0099578 | A1* | 7/2002 | Eicher et al. ...................... 705/7 |
| 2002/0194042 | A1* | 12/2002 | Sands ............................... 705/7 |
| 2003/0084053 | A1* | 5/2003 | Govrin et al. ................. 707/100 |
| 2006/0106626 | A1* | 5/2006 | Jeng et al. ......................... 705/1 |
| 2007/0038683 | A1* | 2/2007 | Dixon et al. .................. 707/202 |
| 2012/0059683 | A1* | 3/2012 | Opalach et al. .............. 705/7.27 |

* cited by examiner

*Primary Examiner* — Mark A Fleischer

(74) *Attorney, Agent, or Firm* — Kilpatrick Townsend & Stockton LLP

(57) ABSTRACT

The invention provides novel systems, methods and software for business activity monitoring. In one aspect of the invention, for example, events can be monitored and/or evaluated before the data is stored in a database. This can provide for real-time business activity monitoring and, in some cases, can prevent the database from becoming a bottleneck in the monitoring process. Merely by way of example, a business activity monitor process might be implemented in a middleware layer between an enterprise application and the database that is used to store data for the application.

25 Claims, 4 Drawing Sheets

INCREMENTAL, REAL-TIME COMPUTATION OF AGGREGATE EXPRESSIONS

FIELD OF THE INVENTION

The present invention relates to computer information systems in general and in particular to systems, methods and software for performing data mining and/or analysis.

BACKGROUND OF THE INVENTION

Over the past several years, enterprise applications have grown in popularity. These applications, including without limitation, financial management applications, customer relations management ("CRM") software, supply chain management software, enterprise resource planning ("ERP") software and the like, provide businesses with enhanced efficiency and flexibility in producing and delivering goods and services. Oracle Corp.'s E-Business Suite™ provides several such applications within a single integrated suite, for example.

More recently, the field of data mining has provided an additional benefit to such businesses. Through data mining, many businesses have been able to identify previously-hidden trends and patterns within large datasets, in particular datasets produced by enterprise applications (and other computer processes) and/or datasets stored in relational databases, such as Oracle 10g™, available from Oracle Corporation. This ability has further promoted efficiency in such organizations.

Business activity monitoring ("BAM") represents a specific type of data mining. Generally, a business activity is modeled using a "business flow," which can be thought of as a group of related events that together form the business activity that is monitored with the BAM process. BAM generally comprises providing real-time (or near-real time) access to key business performance indicators and other metrics, which can provide timely insight into business performance, allowing for even greater flexibility and efficiency in business processes. A "metric" evaluates a desired expression against a single instance of a business flow, while a "key performance indicator" ("KPI") evaluates an expression against multiple instances of a business flow.

Consider, for example, a business flow for daily sales activity. Each event in the business flow might comprise the sales data for a particular region. One metric of this business flow might be a metric measuring the sales amount of an invoice, which might be calculated by combining the sales amounts of individual line items on the invoice. A KPI for this business flow might be a monthly sales figure, which would be the aggregate value of the sales data for each daily business flow over the course of a month.

Traditionally, BAM has been implemented as a database-centric process. In other words, in a typical environment, data from one or more events are stored in a database, and a BAM process periodically queries the database for the data necessary to calculate the desired metrics and/or KPIs. Such processes often use database triggers, data mining tools and/or the like to obtain the necessary data from the database. Such solutions, however, do not provide truly real-time access to the relevant data. Instead, the metrics and KPIs are calculated from historical data, which has already been stored in the database.

Moreover, database-centric BAM solutions often do not scale gracefully in proportion to the generation rate of events. If a given database is used both to service an enterprise application and as a source for BAM queries, the database can become a performance bottleneck as it attempts both to store new data and to provide that data for BAM calculations.

BRIEF SUMMARY OF THE INVENTION

The invention provides novel systems, methods and software for business activity monitoring. In one aspect of the invention, for example, events can be monitored and/or evaluated before the data is stored in a database. This can provide for real-time business activity monitoring and, in some cases, can prevent the database from becoming a bottleneck in the monitoring process. Merely by way of example, a business activity monitor process might be implemented in a middleware layer between an enterprise application and the database that is used to store data for the application.

One set of embodiments provides methods, including without limitation methods for monitoring business activities. In a set of embodiments, a method analyzes a business process based on events and/or data obtained from an event source (such as an enterprise application, etc.) without having to first obtain the data from a database. That is, in some cases, the data can be analyzed, and a measured indicator updated based on the data, prior to (and/or simultaneously with) the storage of the data in a database.

An exemplary method might comprise storing (e.g., at a business activity monitor) an aggregate value of a measured indicator (which might be, inter alia, a key performance indicator, a metric, etc.) related to a particular business activity. In some cases, the measured indicator might be a complex measured indicator, which is derived from one or more other measured indicators.

The method, in some cases, further comprises receiving (perhaps at a business activity monitoring process and/or from an event source), data about an event related to the business activity. In some cases, the data might comprise the event itself. In a set of embodiments, the data might be analyzed to determine whether the event comprises data that should be used to update the measured indicator. A new value of the measured indicator might be calculated, perhaps based on the data received from the event source and/or the aggregate value of the measured indicator might be updated with the new value. In some cases, the method might also comprise propagating at least some of the data received from the event source for storage within a database.

Another set of embodiments comprises systems, including without limitation systems that are configured to perform methods of the invention. One exemplary system comprises a processor and a set of instructions executable by the processor. The set of instructions might comprise instructions to store an aggregate value of a measured indicator related to a particular business activity, and/or instructions to receive data about an event related to the business activity. There might also be instructions to calculate a new value of the measured indicator, perhaps based on the data received from the event source, and/or instructions to update the aggregate value of the measured indicator with the new value. In some embodiments, the set of instructions further comprises instructions to propagate at least some of the data received from the event source for storage within a database.

Another exemplary system comprises an event source configured to generate a plurality of events related to a business flow, a database configured to store data from each of the plurality of events, and a business activity monitor system in communication with the at least one event source and the database. The event source might be an enterprise application, to name but one example. In a set of embodiments, the business activity monitor system might reside in a middleware layer between the event source and the database.

In an aspect, the business activity monitor system might comprise a processor and a set of instructions executable by the processor. The set of instructions might include instructions to store an aggregate value of a measured indicator related to a particular business activity and/or instructions to receive an event from the event source. The event might comprise a set of event data about the event. The set of instructions might also include instructions to analyze the event to determine whether the event data should be used to update the aggregate value of the measured indicator and/or instructions to update the aggregate value of the measured indicator, based, perhaps, on the event data. In some cases, the business activity monitor system might further include instructions to propagate the event data to the database for storage.

Yet another set of embodiments comprises computer software programs. A computer software program in accordance with some embodiments might be embodied on a computer readable medium and/or might comprise a set of instructions executable by one or more computers and/or processors. In some embodiments, the set of instructions might comprise one or more instructions executable to perform methods of the invention. In other embodiments, the software program might be implemented on systems of the invention.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION OF THE INVENTION

Figure 1:
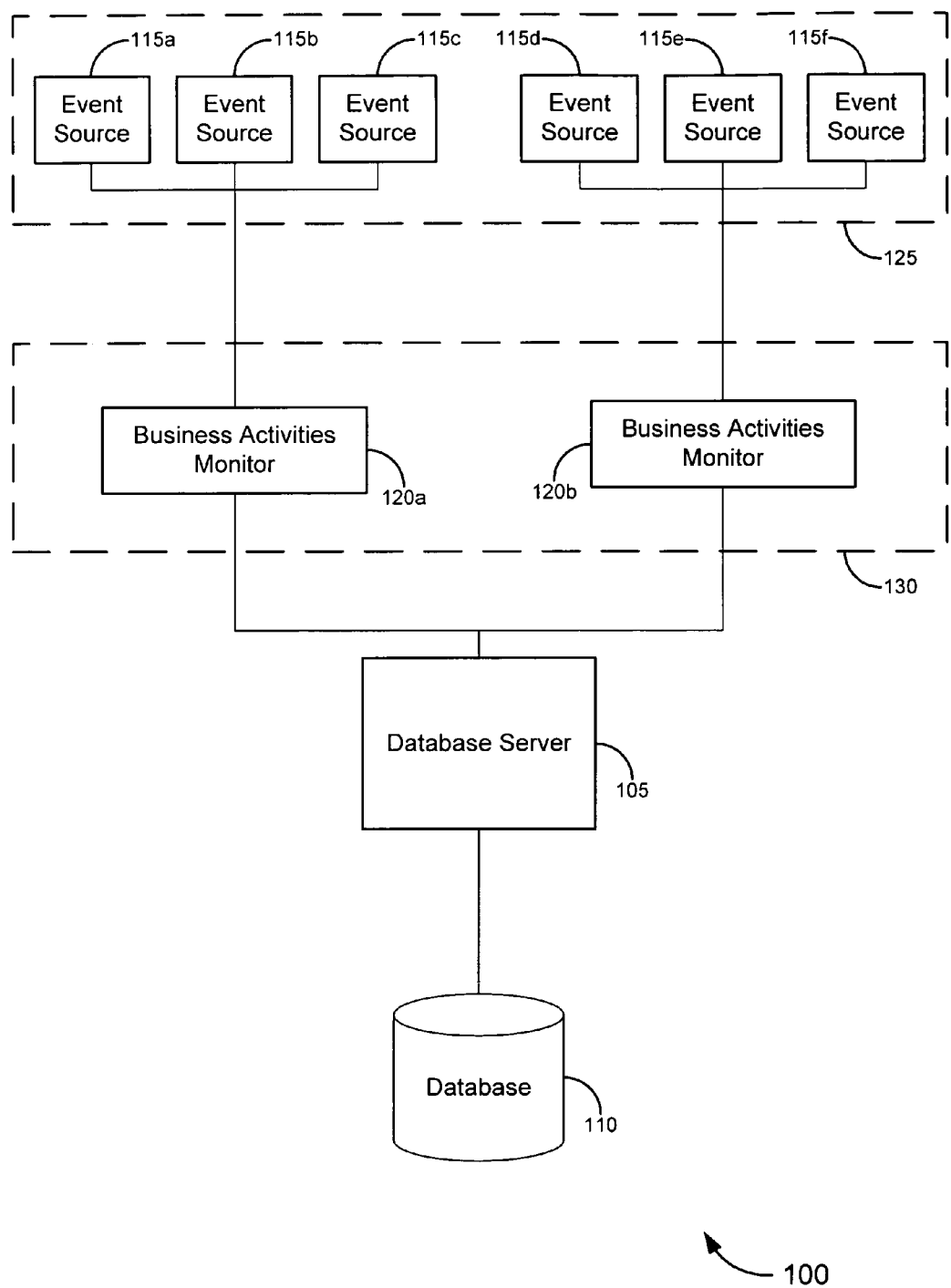
FIG. 1 is a block diagram illustrating a system for performing business activity monitoring, in accordance with a set of embodiments.

The invention provides novel systems, methods and software for business activity monitoring. In one aspect of the invention, for example, events can be monitored and/or evaluated before the data is stored in a database. This can provide for real-time business activity monitoring and, in some cases, can prevent the database from becoming a bottleneck in the monitoring process. Merely by way of example, a business activity monitor process might be implemented in a middleware layer between an enterprise application and the database that is used to store data for the application.

Consider, for example, a situation in which sales revenue for a particular application is to be monitored. In a conventional system, each new value of sales revenue might be stored in a database, and a BAM process might be configured to obtain each such value from the database and, based on those values, calculate an aggregate sales revenue figure (perhaps over some specified duration.

In an aspect of the invention, however, the BAM process might be configured to receive the sales revenue data as it is generated (e.g., by an enterprise application, etc.). The BAM process, then can maintain one or more aggregate values for a measured indicator related to the sales revenue. (As used herein, the term "measured indicator" refers to any value that is monitored, measured and/or tracked in order to evaluate a particular business activity. Such measured indicators can include, without limitation, metrics and key performance indicators ("KPI").)

Merely by way of example, if current aggregate value for sales revenue is $1000, based on four sales revenue events (each of which might be a single sale transaction, a daily revenue total, a regional revenue total, etc.), and a new event is generated with a sales revenue value of $250, a KPI measuring the aggregated sales revenue might be updated to a value of $1250 (calculated by adding the new value of $250 to the existing aggregate value of $1000), and KPI measuring the number of events (e.g., number of sales, etc.) might be updated to a value of five (calculated by incrementing an existing count of events by one to account for the new event).

In this example, another KPI might measure the average amount per sale. This KPI might be a complex KPI, which (as described in further detail below), can be calculated from the aggregate values of other KPIs. As such, in some embodiments, the value of this complex KPI might not be stored; instead, in certain embodiments, an expression for calculating the KPI's value can be stored, and/or the value of the KPI can be calculated from this expression on demand. In this example, the average amount per sale might be calculated by dividing the aggregate value of the KPI measuring the aggregated sales revenue by the aggregate value of the KPI measuring the number of sales.

In a set of embodiments, these evaluations can be performed at the BAM process without ever having to obtain data from the database (although, as discussed below, the BAM process might, but need not, be configured to obtain historical aggregate values from the database upon startup). In this way, certain embodiments can perform evaluations of KPIs and metrics in real-time (i.e., as the events are generated, and/or without having first to wait for the data to be written to the database and then to access the data in the database).

Moreover, certain embodiments of the invention can be relatively scalable, at least in part because they evaluate measured indicators based on data incoming from the event source, without having to access a database to obtain the data. Hence, in high-throughput applications, the database (which might only have to store the data and thus might not have to respond to queries from the BAM process itself) is relatively less likely to become a performance bottleneck for the BAM process.

FIG. 1 illustrates a system 100 that can be used for business activity monitoring. The system 100 might comprise one or more database servers 105, which might manage one or more databases 110. The database(s) 110 generally are used to store data generated and/or used by one or more event sources 115, which can include any source of data that can be stored in the database(s) 110. Merely by way of example, in certain embodiments, one or more event source(s) 115 might be enterprise applications, such as those commercially available from Oracle, PeopleSoft, JD Edwards and Company, SAP, and/or the like. Other event sources 115 might include a file system (such as, for example, any of the file systems commonly used by various Microsoft Windows™ and/or various UNIX™ (and/or UNIX™-like) operating systems), an enterprise service bus ("ESB"), a workflow (such as, for example, a workflow created using the Business Process Execution Language ("BPEL") known to those skilled in the art), and/or the like. Based on the disclosure herein, one skilled in the art will recognize that a variety of other event sources can be used in accordance with various embodiments. In general, an event source 115 might be a participant in a business activity (which might be modeled by a business flow), and often will generate a plurality of events that represent portions of that business flow.

The system 100 might also include one or more business activity monitors 120. In accordance with various embodiments of the invention, a business activity monitor 120 can be any process and/or device that performs business activity monitoring. Merely by way of example, a business activity monitor 120 might comprise a dedicated software application running on a dedicated computer. In other embodiments, a business activity monitor might comprise a process running alongside other processes on a computer. In particular embodiments, however, a business activity monitor 120 generally will be separate from a database 110 and, as noted herein, a business activity monitor 120 in accordance with some embodiments of the invention often operates independently of the database 110, obtaining data from the event sources 115 themselves as opposed to from the database 110 (except, as noted elsewhere herein, when obtaining historical data from the database 110 as part of an initialization process). (As noted above, business activity monitoring is referred to herein as "BAM." For clarity and ease of description, a business activity monitor is sometimes referred to herein simply as a "monitor.")

As noted above, in accordance with some embodiments, an event source 115 might generate one or more events that represent portions of one or more business flows. Merely by way of example, a call center application might generate multiple events for each trouble call. An event often will comprise data, which might include one or more attributes and/or values that are related to the business activity being monitored. Merely by way of example, in the call center application, a business flow representing an attendant answering a call might comprise a plurality of events, such as a new call event, an answered event, an end of call event, etc.

In a set of embodiments, each instance of a business flow (which can be considered a business flow object) might be represented by a data structure, which can be used to store, inter alia, metrics and/or KPIs that are monitored for that type of business flow. Each business flow object might have an object identifier (referred to herein as a "correlation ID"), which uniquely identifies that business flow object from other business flow objects. Merely by way of example, in the call center application, each new call received might trigger the creation of a new instance of the business flow (with a corresponding data structure for that business flow object). Events associated with that call, then, might include the correlation ID for that business flow object. This correlation ID can be used, as described below for example, to determine which (if any) business flow objects a received event pertains to. As noted above, an event often will comprise data and/or attributes. The data structure for a business flow object, then, might be configured to store and/or aggregate values of such data/attributes (e.g., as metrics and/or KPIs).

In a set of embodiments, a monitor 210 might be configured to cache data structures for a plurality of business flow objects (e.g., in a memory at the monitor 120). In some cases, business flow objects will be aged out of the cache (for instance, to reduce memory requirements and/or to provide room in the cache for new objects). Hence, as a business flow object ages (e.g., as the time since the last received event for that object increases), that object might, at some point be removed from the cache. As noted below, however, a monitor 120 might be configured to propagate event data to a database 110. Hence, if a new event is received that has a correlation ID identifying that event as relating to an object no longer in the monitor's cache, a copy of the object (i.e., the data structure) for that business flow instance can be obtained from persistent storage (e.g., a database 110), so that, for example, any relevant monitored indicators can be updated. At that point, the business flow object might again begin to age, until a new event is received or the object is removed from the cache once again.

Hence, event attributes and/or data can be used to calculate any relevant monitored indicators stored in a data structure for a particular business flow object. For instance, returning to the call center application, the business flow, as noted above might include a new call event, which might indicate that a new call was received; the new call event might comprise values for a plurality of variables, such as value for a variable indicating the call type, a value for a timestamp variable indicating when the new call was received, and/or the like. An answered event might indicate that the call was answered by an attendant and might comprise values for one or more variables, such as a timestamp variable, a variable identifying the attendant, and/or the like. An end of call event might comprise a plurality of variables, such as an event might comprise a Boolean value for a "resolved" variable, indicating whether the caller's problem was resolved (in other cases, the "end of call" event might itself indicate that the call was resolved), as well, perhaps as another timestamp value and/or other appropriate variables.

The values of each of these variables might represent metrics that might be stored in the data structure for that business flow object. Other measured indicators can be calculated from these metrics. Merely by way of example, a hold time metric for the business flow object, indicating how long the caller was on hold before the call was answered by the attendant, might be calculated by subtracting the value of the timestamp of the new call event from the value of the timestamp of the answer event.

One skilled in the art will appreciate, based on the disclosure herein, that there are a variety of enterprise applications (and other event sources) that utilize databases for a variety of data storage and management tasks. The relationship between an enterprise application and a database will not be discussed in detail herein, except as how that relationship involves BAM processes in accordance with embodiments of the invention.

In an aspect of the invention, there may be a plurality of monitors 120. Each of the plurality of monitors 120 might be configured to monitor a separate set of events (e.g., events associated with separate business flows, etc.). Alternatively and/or additionally, each of the plurality of monitors 120 might be configured to monitor the same set of events, but from different event sources 115. In a set of embodiments, two or more monitors 120 might be arranged in a load balancing configuration, such that events from one or more event sources 115 are routed to a particular monitor 120a, 120b on an as-available basis.

In some cases, an event (or data therefrom) is transmitted from an event source 115 to a monitor 120 (or otherwise obtained by the monitor 120) for evaluation (as described in detail below, for example) and is propagated from the monitor 120 to a database 110 (and/or a database server 105). In other words, the monitor 120 might be responsible for passing the event (and/or data) to the database 110, such that the event source 115 does not transmit data directly to the database 110. In other cases, data might be transmitted from the event source 115 to the monitor 120 and the database 110 (and/or database server 105) separately and/or simultaneously.

Some embodiments might operate in a multi-tiered environment. Merely by way of example, in a set of embodiments, the event source(s) 115 might be configured to operate in an application layer 125, while the monitors 120 might be configured to operate in a middleware layer 130. One skilled in the art will appreciate, based on the disclosure herein, that in such embodiments, the monitors 120 might be configured to intermediate communication between the event source(s) 115 and the database 110 (and/or database server 105). Merely by way of example, as noted above, in some embodiments, a monitor 120 might be configured to receive events and/or data from the event source(s) 115 and propagate the events and/or data for reception by the database 110 (and/or database server 105).

Figure 2:
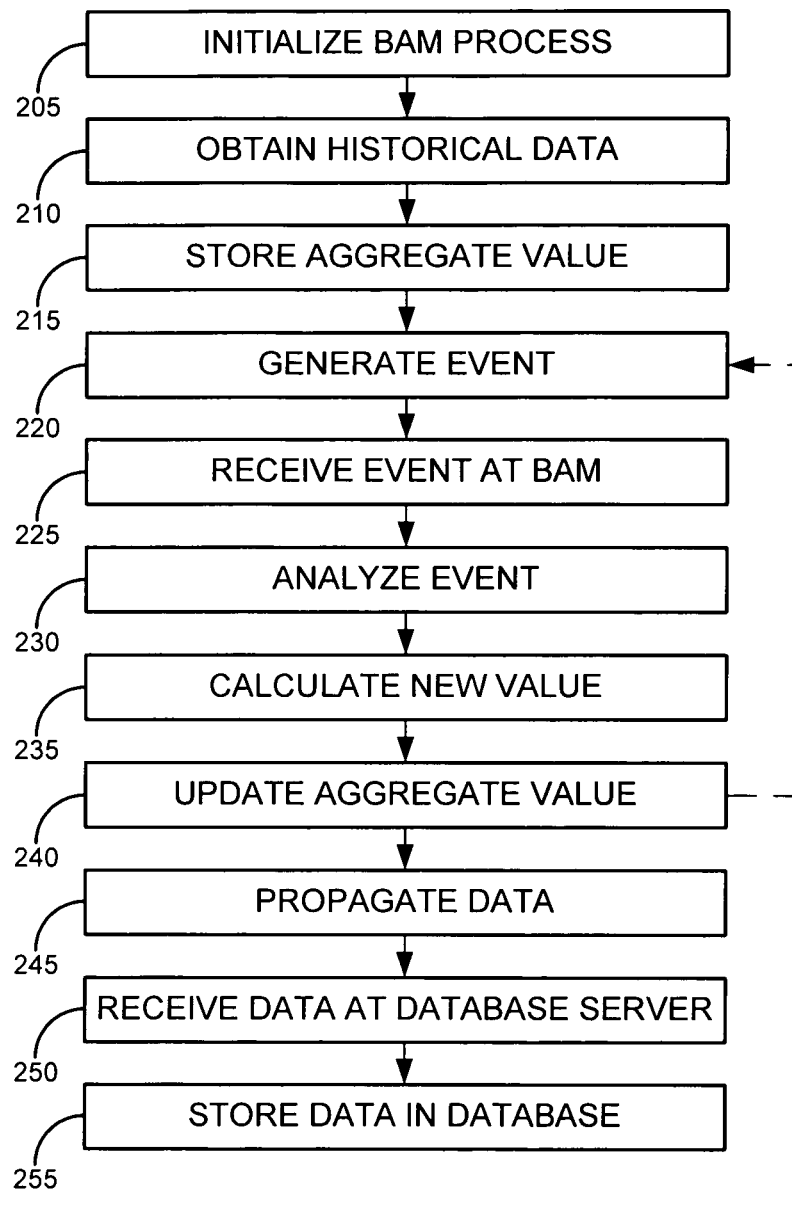
FIG. 2 is a process flow diagram illustrating a method of monitoring business activities, in accordance with a set of embodiments.

For ease of description, the operation of the system 100 (and in particular the monitor 120) in accordance with some embodiments is described in detail with respect to the method 200 illustrated by FIG. 2. It should be noted, however, that systems of the invention are not limited to performing any particular method. Likewise, methods of the invention are not limited to any particular structural or functional architecture or organization. It should also be noted that, while for ease of description, the method 200 is described with respect to evaluating a single measured indicator, but that the method 200 also could be used to evaluate a plurality of measured indicators, including without limitation one or more KPIs, one or more metrics and/or any combination thereof (or for that matter, for aggregating and/or evaluating any data that might be produced by an event source and/or stored in a database).

According to a set of embodiments, the method 200 includes initializing the BAM process (i.e., the monitor), which as noted above, might be a process on a dedicated server, a process running on a server alongside other processes, etc. (block 205). In some embodiments, the initialization process might comprise loading one or more business flow objects from persistent storage into the monitor's cache. The initialization process might further include identifying any measured indicators that are to be measured, as well, perhaps, as the expression and/or the event/variable values that are to be used to calculate these indicators. In some cases, the indicators to be measured might include one or more complex indicators (which are described in detail below), and the initialization process might also include identifying an expression defining how one or more complex indicators are to be calculated. Identifying these indicators, and the components used to calculate them, can take several forms. Merely by way of example, the monitor might have a set of configuration files provide such information, and/or a database (which might be the database holding the event data) might have tables providing such information.

In particular embodiments, initializing the BAM process might include obtaining (e.g., from a database) historical data for one or more measured indicators (block 210). This historical data may be used to set an initial aggregate value of a measured indicator being monitored. In some cases, the aggregate value itself might be obtained from the database. In other cases, one or more individual values (e.g., based on data from past events) might be obtained from the database and/or used to calculate the initial aggregate value. In a set of embodiments, obtaining this historical data might comprise loading the relevant business flow object into the monitor's cache. In yet other embodiments, initialization of the BAM process might not require obtaining any data from the database (e.g., if the aggregate value is to be initialized at zero—for example, if a measured indicator measures monthly values, initialization of the BAM process at the beginning of a month might be configured to set the initial aggregate value to zero).

It is worth noting at this point that the term "aggregate value" is defined as a value of any measured indicator that is obtained and/or derived from an evaluation of one or more events (and/or the data therefrom) corresponding to a particular business flow. In some cases, the aggregate value might represent the sum of the individual values of data from each of the events. In other cases, the aggregate value might represent a count of events, a maximum and/or minimum value in the set of individual values, etc.

At block 220, an event is generated (e.g., by the event source). An event, as noted above, can be any discrete action or activity within a business flow, and an event might comprise data related to that business flow. The monitor then receives data about the event (block 225). (It should be noted that, in some cases, the data about the event might be the event itself, perhaps including any associated data and/or attributes). In accordance with various embodiments, receiving the event can take a variety of forms. Merely by way of example, in some cases, the event source may be configured to transmit the relevant event and/or data to the monitor after the event is generated. In some cases, the event source may be configured merely to send the event/data to a database, and/or the monitor may be configured to intercept the event/data in route to the database. In this way, for example, the event source—and perhaps even the database/database server—may not need to be specially configured to interoperate with the monitor. In other embodiments, the monitor may be configured to monitor the event source for event generation and/or to access the event source to obtain events. Other variations are possible as well, and for purposes of this document, any procedure by which a monitor obtains an event and/or data associated with the event should be considered "receiving" the event at the monitor.

The monitor might analyze the event and/or the data (block 230), for example to determine whether the event is relevant to a measured metric and/or KPI. This analysis can be accomplished in a variety of ways. In some embodiments, for example, the monitor might identify the appropriate instance of the business flow based on a correlation ID, such that any measured indicators to be updated would be stored in the business flow object associated with that correlation ID. Additionally and/or alternatively, the monitor may analyze the event/data to determine whether an event identifier, data field name, etc. corresponds to an identifier, field name, etc. the monitor is configured to measure. In another set of embodiments, the monitor might maintain a hash table that captures an association between an event and one or more measured indicators (perhaps using correlation IDs) When an event is received, the hash table can be consulted to determine which measured indicator(s) should be updated based on data associated with the event.

If the event/data is relevant to a measured indicator that the monitor is configured to monitor/measure, a new value of the measured indicator is calculated, based on the event/data (block 235). In a set of embodiments, the monitor is configured with an expression that is used to calculate the new value, and the expression often will depend on the nature of the measured indicator that is being monitored. Merely by way of example, if the monitor is configured to monitor a measured indicator that counts the number of events, the expression might simply increment a count every time a new event is received. A variety of expressions may be supported. To name but a few examples, an expression may use one or more arithmetic operations (e.g., addition, subtraction, division, multiplication), aggregation operations (sum ( ), count ( ), min ( ), max ( ), etc.), and/or the like. Those skilled in the art will appreciate that a variety of expressions may be used to calculate different measured indicators, and various embodiments of the invention may support any such expressions as appropriate.

Merely by way of example, if a measured indicator is used to track an aggregated sum of values from a series of events, the aggregate value might be expressed as old_sum, while the event data might be expressed as delta_sum. Hence, the expression for calculating the new value of the measured indicator might be expressed as new_sum=old_sum +delta_sum. As another example, if a measured indicator is used to track a count of events, the aggregate value of the measured indicator might be expressed as old_count, and the expression to calculate a new value of the measured indicator might be expressed as new_count=old_count+1. If a measured indicator is used to track a maximum value from a series of events, the aggregate value of the KPI might be expressed as old_max, and the event data might be expressed as delta_max. The expression used to calculate the new value of the measured indicator then might be new_max=max (old_max, delta_max). (A similar expression could be used to calculate a new value for a measured indicator that tracks a minimum value from a series of events.)

In a set of embodiments, then, the monitor does not need to obtain data for each relevant historical event when calculating a new value for the measured indicator. Instead, the monitor need only maintain a current aggregate value, which then can be evaluated, along with the new event/data, to obtain a new value for the measured indicator when a new event is generated.

These arithmetic and aggregation operations can be used to implement a wide variety of expressions for calculating a measured indicator. For instance, aggregate values of relatively few independent measured indicators (also referred to herein as "independent indicators") (which are calculated directly from event data and which for which aggregate values might be maintained by the monitor) can be "shared" among a wide variety of complex measured indicators (also referred to herein as "complex indicators") (i.e., used to calculate these complex indicators). In a set of embodiments, the sharing of aggregate values of indicators among one or more complex indicators can allow the complex indicator(s) to be calculated on demand, without having to store persistent values of the complex indicators (although this can be done as well). This can, for instance, allow a relatively large number of complex indicators to be available for measurement without imposing correspondingly large memory requirements on the monitor process. For instance, a monitor could store (in memory or otherwise) an expression used to calculate a complex indicator, and when a measurement of that complex indicator is requested (e.g., by a user, another process, etc.), the monitor could calculate the complex indicator on demand. (As noted above, in some cases, the expression used to calculate the complex indicator could be identified upon startup by the monitor.)

To illustrate this principle, consider the following scenario: In a business flow involving the sales orders, a new order event might comprise a value for a sale amount variable, indicating the dollar amount of the order. A canceled order event might be generated if a previous order is canceled. An aggregate value for a total_sales indicator might measure the sum of sales across all events, while an aggregate value for a total_orders indicator might measure the total number of orders across all events, and an aggregate value for a canceled_orders indicator might measure the number of canceled orders across all events. When a new order event is received by the monitor, the total_orders indicator might be incremented and a new value for total_sales indicator might be calculated (perhaps by adding the sale amount value from the event to a previous aggregate value for that indicator). When a canceled order event is generated, the canceled_orders indicator might be incremented.

In this scenario, if a complex indicator entitled percentage_canceled measures a percentage of canceled orders, the expression for calculating a new value of that measured indicator might be expressed as percentage_canceled=(canceled_orders/total_orders)*100. Another complex indicator might be entitled average_sale and might be calculated using the expression average_sale =total_sales/total_orders.

In a set of embodiments, the terms canceled_orders, total_orders, and total_sales indicators might be considered independent indicators, which might be maintained (stored) by the monitor, and the percentage_canceled and average_sale indicators might be considered complex indicators, which depend on the independent measured indicators. Each independent measured indicator then might need to be evaluated only when a new event is relevant to that measured indicator, and the values of these independent measured indicators can be shared across all complex measured indicators that depend upon them. Each complex indicator, as noted above, might not need to be stored, and/or might be calculated only on demand, since aggregated values of the constituent independent indicators (from which the complex indicators are calculated) are stored and available for calculation in real time.

In another set of embodiments, the incremental computation procedures of the invention can be used to perform drilldown and/or rollup operations. Merely by way of example, a drilldown (in which-subcomponents of a particular measured indicator are of interest), can be evaluated, for instance, by assigning a separate measured indicator for each drilldown dimension value. Merely by way of example, if a business operates on four continents (e.g., Europe, North America, Asia and Africa), a drilldown of a measured indicator tracking percentage of canceled orders might be supported by defining measured indicators for (i) the percentage of canceled orders for Europe, (ii) the percentage of canceled orders for North America, (iii) percentage of canceled orders for Asia, and (iv) percentage of canceled orders for Africa, where the measured indicator for each region is calculated based only on events relevant to that region.

Rollups (in which one or more measured indicators might be grouped to analyze a business process on a larger scale), are supported by certain embodiments as well. In some cases, an array of indicator values can be stored for each rollup hierarchy. Merely by way of example, if a measured indicator tracks the percentage of canceled orders, an array of values for that indicator (and/or for each measured indicator on which it depends, if it is a complex indicator, for example) might be maintained by the monitor across a time dimension, with the array containing values for each member of the following exemplary rollup hierarchy: day, month, quarter, year. Hence, each member of the array would represent a value of the measured indicator at some point within the rollup hierarchy. An incoming event, then, might cause each of these values to be updated (depending on whether it is relevant to each value). So, for example, if an event indicated that a new order was placed on a particular day, a total_orders value, a total_sales value and a percentage_canceled value would be updated for the day, month, quarter and year in which the event occurred.

After a new value of the measured indicator has been calculated, the aggregate value of the measured indicator can be updated to reflect the new value (block 240). In other words, the new value is stored at the monitor as the aggregate value. (At this point, the monitor is ready to receive a new event, and the process can repeat, with the updated aggregate value, as illustrated by the broken line on FIG. 2).

In some cases, the event (and/or data therefrom) is propagated to the database for storage (block 245). In some cases, propagating the data might comprise the monitor performing a database insert operation familiar to those skilled in the art. (One skilled in the art will appreciate, based on the disclosure herein, that insert operations often are network input-output ("I/O") intensive, while the calculation of a measured indicator often is processor and/or memory-intensive. Correspondingly, in some embodiments, the calculation of the new value of the measured indicator and the insert operation may be performed simultaneously, perhaps in two separate threads of execution.)

In other cases, propagating the event and/or data might comprise transmitting the data to a database server. The database server, then, might receive the data (block 250). Hence, the data might be stored in the database (block 255), via an insert operation (performed by the monitor, the database server, and/or another component), and/or via any other method known in the art.

Figure 3:
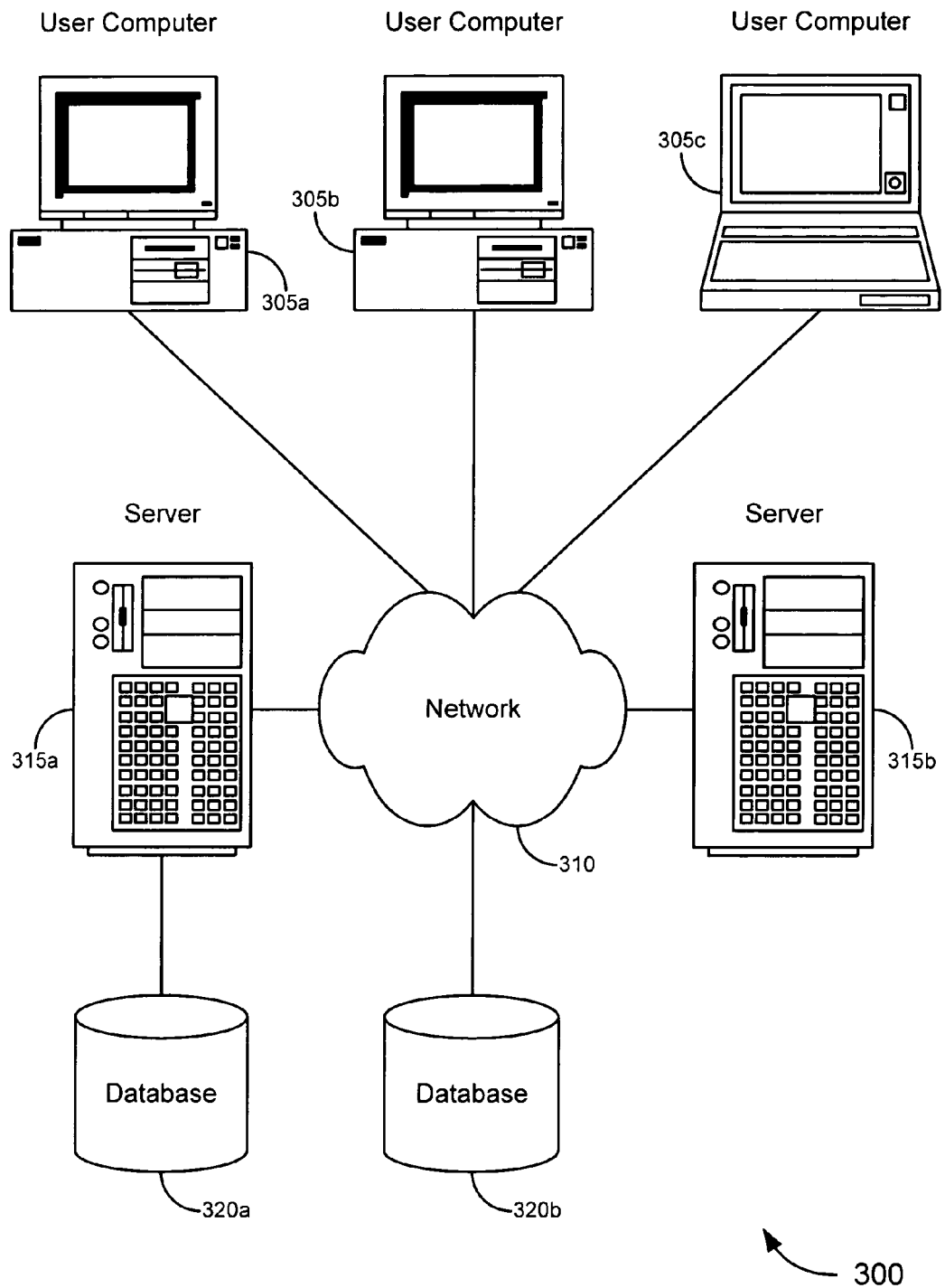
FIG. 3 illustrates a generalized schematic drawing of a system of networked computers, in which a business activity monitoring system can be implemented, in accordance with a set of embodiments.

FIG. 3 illustrates a generalized schematic diagram of a networked system 300 that can be used in accordance with one set of embodiments to perform business activity monitoring. The system 300 might include one or more user computers 305. The user computers 305 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 305 can also have any of a variety of applications, including without limitation database client and/or server applications, and web browser applications. A user computer 305 might be used to configure a business activity monitor (for example, to define measured indicators and/or expressions used to calculate the indicators), to view aggregate values of measured indicators, to communicate with a database and/or enterprise application, etc. In some cases, the user computers 305 can be any other electronic device, such as a thin-client computer, Internet-enabled mobile telephone, and/or personal digital assistant, capable of communicating via a network (e.g., the network 310 described below) and/or displaying and navigating web pages or other types of electronic documents. Although the exemplary system 300 is shown with three user computers, any number of user computers can be supported.

Certain embodiments of the invention operate in a networked environment, which can include a network 310. The network 310 can be any type of network familiar to those skilled in the art that can support data communications using any of a variety of commercially-available protocols, including without limitation TCP/IP, SNA, IPX, AppleTalk, and the like. Merely by way of example, the network 310 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 315. Each of the server computers 315 may be configured with an operating system including without limitation any of those discussed above, as well as any commercially-available server operating systems. Each of the servers 315 may also be running one or more applications, including for example, an application configured to perform business activity monitoring, as described in detail above.

In some cases, one of the servers 315 may be a web server, which can be used, merely by way of example, to process requests for web pages or other electronic documents from user computers 305. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 305 to perform methods of the invention.

The server computers 315, in some embodiments, might include one or more file and or/application servers, which can include one or more enterprise applications (and/or other event sources). Merely by way of example, the server(s) 315 can be one or more general purpose computers capable of executing programs or scripts in response to the user computers 305 and/or other servers 315, including without limitation web applications. Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The server(s) 315 can also include database servers, including without limitation those commercially available from Oracle, Microsoft, Sybase™, IBM™ and the like, which can process requests from database clients running on a user computer 305 and/or another server 315. In some embodiments, an application server can create web pages dynamically for displaying the information in accordance with embodiments of the invention, such as displaying aggregate values of various measured indicators. Data provided by an application server may be formatted as web pages (comprising HTML, Javascript, etc., for example) and/or may be forwarded to a user computer 305 via a web server (as described above, for example). Similarly, a web server might receive web page requests and/or input data from a user computer 305 and/or forward the web page requests and/or input data to an application server.

In accordance with further embodiments, one or more servers 315 can function as a file server and/or can include one or more of the files necessary to implement methods of the invention incorporated by an application running on a user computer 305 and/or another server 315. Alternatively, as those skilled in the art will appreciate, a file server can include all necessary files, allowing such an application to be invoked remotely by a user computer 305 and/or server 315. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 320. The location of the database(s) 320 is discretionary: merely by way of example, a database 320a might reside on a storage medium local to (and/or resident in) a server 315a (and/or a user computer 305). Alternatively, a database 320b can be remote from any or all of the computers 305, 315, so long as it can be in communication (e.g., via the network 310) with one or more of these. In a particular set of embodiments, a database 320 can reside in a storage-area network ("SAN") familiar to those skilled in the art. (Likewise, any necessary files for performing the functions attributed to the computers 305, 315 can be stored locally on the respective computer and/or remotely, as appropriate.) In one set of embodiments, the database 335 can be a relational database, such as an Oracle database, that is adapted to store, update, and retrieve data in response to SQL-formatted commands. The database 335 might be controlled and/or maintained by a database server, as described above, for example.

Figure 4:
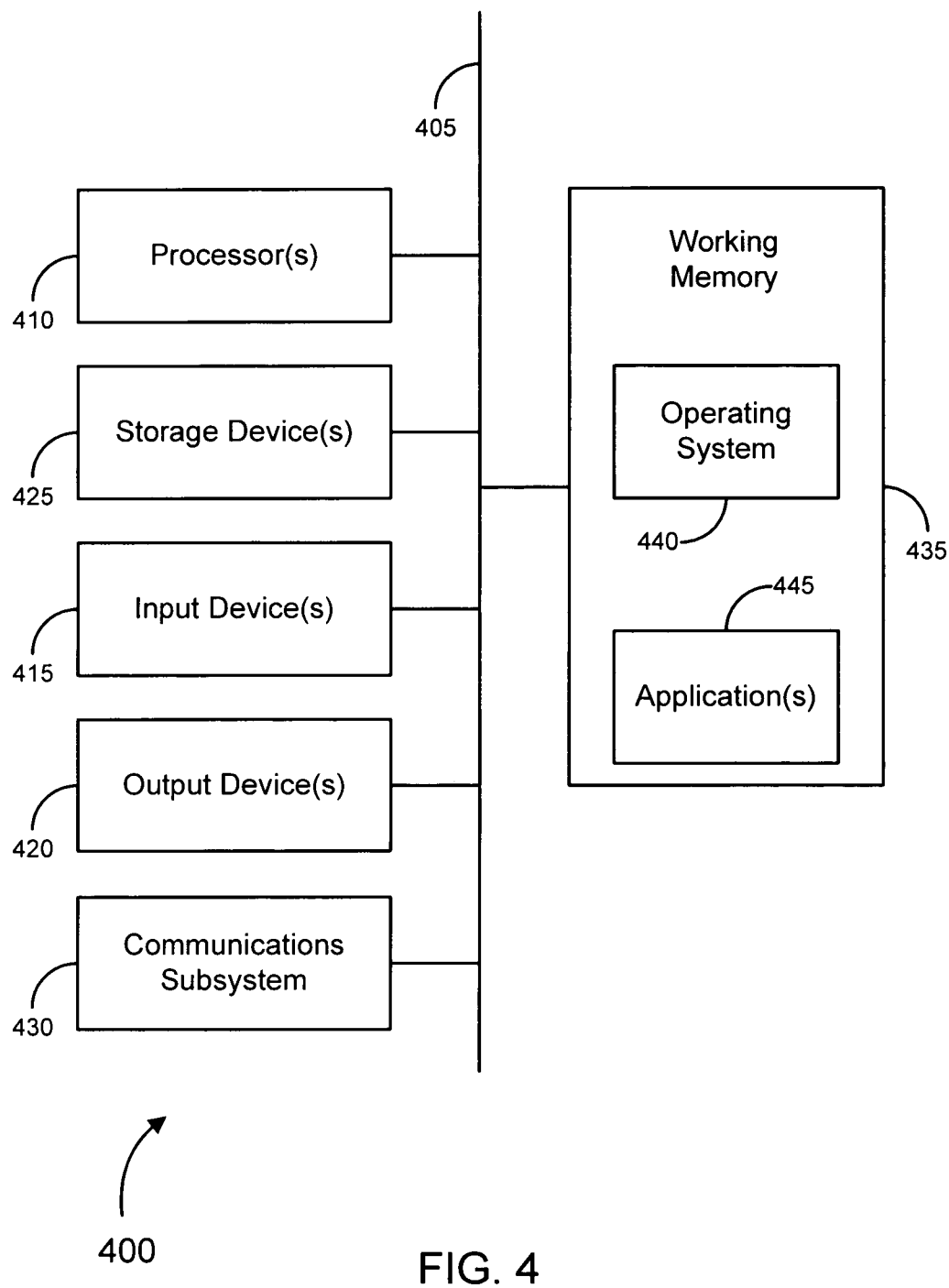
FIG. 4 illustrates a generalized schematic diagram of a computer system that can be used in accordance with various embodiments of the invention.

FIG. 4 provides a schematic illustration of one embodiment of a computer system 400 that can perform the methods of the invention and/or the functions of the event source, business application monitor and/or database server, as described herein. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner. The computer system 400 is shown comprising hardware elements that can electrically coupled via a bus 405 (or may otherwise be in communication, as appropriate). The hardware elements can include one or more processors 410, including without limitation one or more general-purpose processors and/or one or more special-purpose processors (such as digital signal processing chips, graphics acceleration chips, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 4 might also include a communications subsystem 430; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 430 may permit data to be exchanged with a network (such as the network 310 described above, and/or any other devices described herein. In many embodiments, the computer system 400 will further comprise a memory 435, which can include a RAM or ROM device, as described above.

The computer system 400 also can comprise software elements, shown as being currently located within a working memory 435, including an operating system 440 and/or other code 445, such as one or more application programs, which may comprise computer programs of the invention and/or may be designed to implement methods of the invention, as described herein. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for performing business activity monitoring, the system comprising:
   an event source configured to generate a plurality of events related to a particular business activity and send the plurality of events to a database;
   the database configured to store data from each of the plurality of events; and
   a business activity monitor system in communication with the event source and the database, the business activity monitor system comprising one or more processors and one or more memory devices having stored thereon instructions, which when executed by the one or more processors, cause the one or more processors to:
      intercept a first event in the plurality of events sent from the event source to the database; wherein the first event comprises a correlation ID and a first data set;
      determine that the event represents a new business flow;
      create a business flow object to store data associated with the business flow;

intercept a second event in the plurality of events sent from the event source to the database; wherein the second event comprises the correlation ID and a second data set;
determine that the second event is part of the business flow based on the correlation ID;
store an aggregate value of a measured indicator related to the particular business activity, wherein:
the aggregate value of the measured indicator is calculated using the first data set and the second data set; and
the aggregate value of the measured indicator is stored in the business flow object at the business activity monitor system;
calculate a value of a complex indicator, wherein the value of the complex indicator depends on the aggregate value of the measured indicator;
intercept subsequent events sent from the event source to the database over time that include the correlation ID, and thereby incrementally update the aggregate value of the measured indicator and the value of the complex indicator, wherein the value of the complex indicator is updated in real time; and
propagate at least part of each intercepted event to the database for storage.

2. The system as recited by claim 1, wherein the measured indicator comprises a metric related to the particular business activity.

3. The system as recited by claim 1, wherein the measured indicator comprises a key performance indicator related to the particular business activity.

4. The system as recited by claim 1, wherein the business activity monitor system resides in a middleware layer between the event source and the database.

5. The system as recited by claim 1, wherein the event source is an enterprise application.

6. A business activity monitor system for monitoring a business activity, the business activity monitor system comprising:
one or more processors; and
one or more memories having stored thereon instructions, which when executed by the one or more processors, cause the one or more processors to:
intercept a first event in a plurality of events sent from an event source to a database; wherein the first event comprises a correlation ID and a first data set;
determine that the event represents a new business flow;
create a business flow object to store data associated with the business flow;
intercept a second event in the plurality of events sent from the event source to the database; wherein the second event comprises the correlation ID and a second data set;
determine that the second event is part of the business flow based on the correlation ID;
store an aggregate value of a measured indicator related to the particular business activity, wherein:
the aggregate value of the measured indicator is calculated using the first data set and the second data set; and
the aggregate value of the measured indicator is stored in the business flow object at the business activity monitor system;
calculate a value of a complex indicator, wherein the value of the complex indicator depends on the aggregate value of the measured indicator;
intercept subsequent events sent from the event source to the database over time that include the correlation ID, and thereby incrementally update the aggregate value of the measured indicator and the value of the complex indicator, wherein the value of the complex indicator is updated in real time; and
propagate at least part of each intercepted event to the database for storage.

7. A system as recited by claim 6, wherein the system resides in a middleware layer between the event source and the database.

8. A method of monitoring a business activity by a business activity monitoring process, the method comprising:
intercepting, using a processor, a first event in a plurality of events sent from an event source to a database; wherein the first event comprises a correlation ID and a first data set;
determining, using the processor, that the event represents a new business flow;
creating, using the processor, a business flow object to store data associated with the business flow;
intercepting, using the processor, a second event in the plurality of events sent from the event source to the database; wherein the second event comprises the correlation ID and a second data set;
determining, using the processor, that the second event is part of the business flow based on the correlation ID;
storing, using the processor, an aggregate value of a measured indicator related to the particular business activity, wherein:
the aggregate value of the measured indicator is calculated using the first data set and the second data set; and
the aggregate value of the measured indicator is stored in the business flow object at the business activity monitor system;
calculating, using the processor, a value of a complex indicator, wherein the value of the complex indicator depends on the aggregate value of the measured indicator;
intercepting, using the processor, subsequent events sent from the event source to the database over time that include the correlation ID, and thereby incrementally updating the aggregate value of the measured indicator and the value of the complex indicator, wherein the value of the complex indicator is updated in real time; and
propagating, using the processor, at least part of each intercepted event to the database for storage.

9. A method as recited by claim 8, further comprising:
determining an expression used to calculate the aggregate value of the complex indicator.

10. A method as recited by claim 8, wherein the measured indicator comprises an array of values, the array of values comprising a plurality of values for the measured indicator, each of the plurality of values representing a value of the measured indicator at a point within a rollup hierarchy.

11. A method as recited by claim 8, wherein the measured indicator comprises a plurality of values, each of the plurality of values corresponding to a drilldown component of the measured indicator.

12. A method as recited by claim 8, further comprising:
analyzing the second event to determine that the second event comprises data that should be used to update the measured indicator.

13. A method as recited by claim 12, wherein analyzing the second event comprises consulting a hash table configured to capture an association between an event and a measured indicator.

14. A method as recited by claim 8, further comprising obtaining from the database a historical value of the measured indicator, wherein storing the aggregate value of the measured indicator comprises storing the historical value of the measured indicator.

15. A method as recited by claim 8, wherein incrementally updating the aggregate value of the measured indicator comprises evaluating a mathematical operation involving the aggregate value and a second value.

16. A method as recited by claim 8, wherein incrementally updating the aggregate value of the measured indicator comprises performing an aggregation operation involving the aggregate value and a second value.

17. A method as recited by claim 8, wherein the aggregate value of the measured indicator comprises a sum of a set of values, each member of the set of values comprising a value related to one of the plurality of events.

18. A method as recited by claim 17, wherein incrementally updating the aggregate value of the measured indicator comprises adding the second value to the sum of the set of values.

19. A method as recited by claim 8, wherein the aggregate value of the measured indicator comprises a count of the plurality of events.

20. A method as recited by claim 19, wherein incrementally updating the aggregate value of the measured indicator comprises incrementing the count of the plurality of events.

21. A method as recited by claim 8, wherein the aggregate value of the measured indicator comprises a maximum value from a set of values, each member of the set of values comprising a value related to one of the plurality of events, and wherein incrementally updating the aggregate value of the measured indicator comprises:
   determining whether the second value is greater than the maximum value; and
   if the second value is greater than the maximum value, setting the new value of the measured indicator to the second value.

22. A method as recited by claim 8, wherein the aggregate value of the measured indicator comprises a minimum value from a set of values, each member of the set of values comprising a value related to one of the plurality of events, and wherein incrementally updating the aggregate value of the measured indicator comprises:
   determining whether the second value is less than the minimum value; and
   if the second value is less than the minimum value, setting the new value of the measured indicator to the second value.

23. A method as recited by claim 8, wherein the data about the event is received at the business activity monitoring process before it is stored in the database.

24. A method as recited by claim 8, wherein the aggregate value of the measured indicator is stored at the business activity monitoring process.

25. A non-transitory machine-readable medium having instructions stored thereon which, when executed by one or more processors, cause the one or more processors:
   intercept a first event in a plurality of events sent from an event source to a database; wherein the first event comprises a correlation ID and a first data set;
   determine that the event represents a new business flow;
   create a business flow object to store data associated with the business flow;
   intercept a second event in the plurality of events sent from the event source to the database; wherein the second event comprises the correlation ID and a second data set;
   determine that the second event is part of the business flow based on the correlation ID;
   store an aggregate value of a measured indicator related to the particular business activity, wherein:
      the aggregate value of the measured indicator is calculated using the first data set and the second data set; and
      the aggregate value of the measured indicator is stored in the business flow object at the business activity monitor system;
   calculate a value of a complex indicator, wherein the value of the complex indicator depends on the aggregate value of the measured indicator;
   intercept subsequent events sent from the event source to the database over time that include the correlation ID, and thereby incrementally update the aggregate value of the measured indicator and the value of the complex indicator, wherein the value of the complex indicator is updated in real time; and
   propagate at least part of each intercepted event to the database for storage.

* * * * *

UNITED STATES PATENT AND TRADEMARK OFFICE
CERTIFICATE OF CORRECTION

PATENT NO. : 8,886,549 B2  
APPLICATION NO. : 11/322496  
DATED : November 11, 2014  
INVENTOR(S) : Herwadkar Page 1 of 1

It is certified that error appears in the above-identified patent and that said Letters Patent is hereby corrected as shown below:

In the Specification

In column 4, line 15, delete "("KPI")." and insert -- ("KPI")). --, therefor.

In column 5, line 34, delete ""monitor."" and insert -- "monitor"). --, therefor.

In column 9, line 31, delete "events.)" and insert -- events). --, therefor.

In column 9, line 63, delete "monitor.)" and insert -- monitor). --, therefor.

In column 10, line 40, delete "which-subcomponents" and insert -- which subcomponents --, therefor.

In column 11, line 24, delete "execution.)" and insert -- execution). --, therefor.

Signed and Sealed this
Twenty-third Day of June, 2015

Michelle K. Lee
*Director of the United States Patent and Trademark Office*